(No Model.)
J. R. ANDERSON.
HUB ATTACHING DEVICE.
No. 249,217.
Patented Nov. 8, 1881.
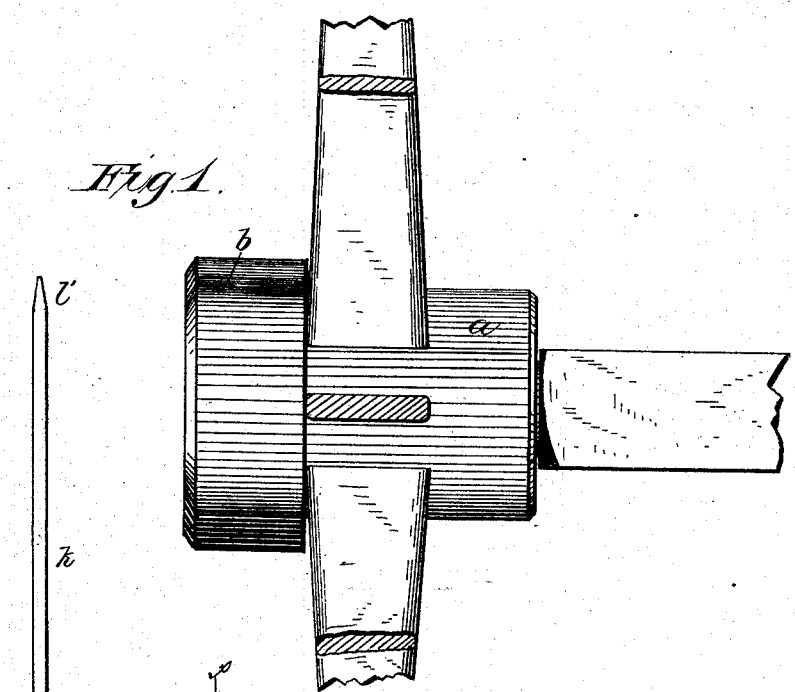
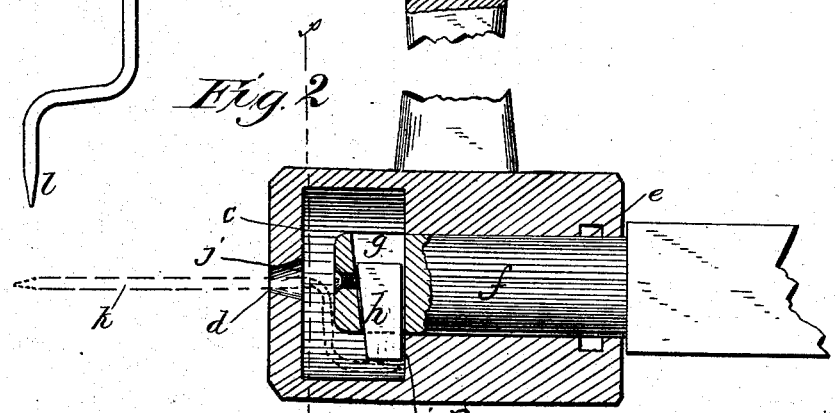
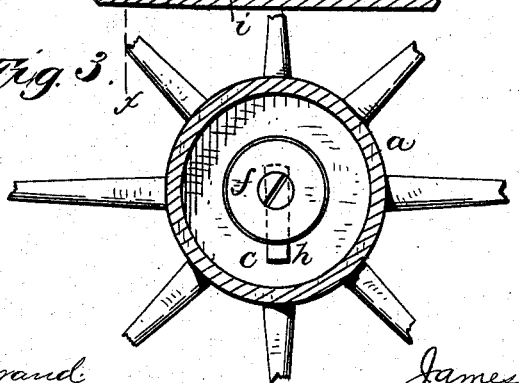
WITNESSES
INVENTOR
James R. Anderson
by Geo. M. Finckel
Attorney

UNITED STATES PATENT OFFICE.

JAMES R. ANDERSON, OF LONACONING, MARYLAND.

HUB-ATTACHING DEVICE.

SPECIFICATION forming part of Letters Patent No. 249,217, dated November 8, 1881.

Application filed September 15, 1881. (No model.)

*To all whom it may concern:*

Be it known that I, JAMES R. ANDERSON, a citizen of the United States of America, residing at Lonaconing, in the county of Alleghany and State of Maryland, have invented certain new and useful Improvements in Hubs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is in the nature of improvements in hubs for car-wheels, such as mine-car wheels, where the hub and wheel are made in one piece or casting; but the invention is also applicable to hubs made separate from the other parts of the wheel and to axle-boxes for wooden hubs.

The invention relates to improved means of attaching the wheels to the axle-nibs; and the invention consists in a self-acting linchpin arranged in a slot in the end of the axle-nib, so that when the nib is inserted into the wheel the hub of which is provided with an internal lubricating-cavity, said linchpin will fall down in the nib-slot and project into the cavity in such manner as to securely hold the wheel to the axle. Provision is preferably made to lock the linchpin in its attaching position, the whole arrangement being also so designed as to facilitate the unlocking of the linchpin for the removal of the wheel.

In the accompanying drawings, illustrating my invention, in the several figures of which like parts are similarly designated, Figure 1 is a side elevation of parts of a wheel and axle, showing one form of a self-lubricating hub. Fig. 2 is a longitudinal section, showing another form of self-lubricating hub, and also the hub-attaching device. Fig. 3 is a section of the hub taken on line *x x*, Fig. 2; and Fig. 4 is a side elevation of a convenient device for use in detaching the wheel.

The hub *a* may be cast in one piece with the spokes or web and rim of the wheel, or it may be a wooden or other hub, into which the spokes are inserted, as usual.

The essential feature of the hub is an inclosed lubricating-chamber, *b*. This lubricating-chamber may be larger than the body of the hub, as in Fig. 1, to admit of a large lubricant-containing cavity; or, as in Fig. 2, the lubricant-containing cavity *c* may be formed in a hub of uniform external diameter. When this cavity is made in an axle-box for use in a wooden or composite hub, the cavity-chamber will be of greater diameter than the pipe proper. Access is had to this cavity through an inwardly-flaring hole, *d*, made in the face of the chamber, and whether this chamber be in the hub or in the axle-box it will be the outermost portion thereof. By having the hole *d* flare inwardly, as shown in Fig. 2, lubricating material can be most easily introduced.

The hub or axle-box is made with a recess, *e*, in its rear portion, next adjacent the axle-nib, to receive a packing or washer, to prevent the loss of lubricant and the ingress of dirt. The forward end of the axle-nib *f* is made with a slot, *g*, which is preferably tapering. In this slot is placed a correspondingly-shaped linchpin, *h*, of a length equal to or somewhat less than the diameter of the axle-nib or the bore of the hub or axle-box. This linchpin is of such dimensions as that when inserted in the nib-slot it can be held entirely inclosed within said slot or be allowed to drop down in said slot and its end project more or less below the hub-bore and into the lubricant-cavity, where, abutting against the wall *i* of the cavity, it will prevent the separation of the wheel and axle, or, in other words, attach the wheel to the axle. To prevent the dislodging of the linchpin when in this position, a screw, *j*, tapped in the end of the nib in line with the pin is operated through the hole *d* to lock the pin within the slot. This screw may also be used to lock the pin within the slot until the nib shall have been inserted in the wheel, and when said nib is so inserted the screw may be retracted to permit the pin to fall into its attaching position, Fig. 2, after which said screw is again turned up to lock the pin. When the wheel is to be detached, the screw *j* is loosened, and the device *k* (shown in Fig. 4) may have its end *l* or *l'* shaped like a screw-driving blade, to serve as the means for operating said screw. The said device *k* is inserted into the cavity *c* through the hole *d* until it is brought into the position indicated in dotted lines in Fig. 2. When in this position it is used as a lever or lifting device to raise the linchpin into the slot $g$ in the axle-nib until such pin shall be wholly within said slot, when the wheel may be pulled off the axle-nib.

If the wheel is to remain off the axle any length of time, the linchpin in the axle-nib may be secured from loss by means of the screw $j$.

It will be understood that the screw $j$ is not absolutely necessary for the retention of the linchpin when the wheel is attached to the axle, since the said pin, being preferably wedge-shaped, will bind in the slot, and thus be prevented from accidental displacement.

By my construction of hub and attaching device lubricant can be introduced into the cavity $c$ through the hole $d$ without turning the wheel, there being no inlet to be turned uppermost. My construction also possesses the merits of small first cost and economy of material.

The recess $e$ and the washer or packing therein may or may not be used, as desired.

What I claim is—

1. A hub-attaching device composed of a hub having a cavity, $c$, combined with a slotted axle-nib and a linchpin of a length not greater than the diameter of the axle-nib arranged in the slot of said nib, and adapted to project beyond said nib and into the cavity $c$, substantially as and for the purpose described.

2. An axle-nib provided with a slot, combined with a linchpin, and means to lock said linchpin wholly within the slot or in any other position, substantially as and for the purpose described.

3. The axle-nib slotted diametrically, combined with a linchpin of a length not greater than the diameter of such nib, and arranged for operation within said slot, as specified, and a screw to lock said pin in any given position, substantially as described.

4. In a hub-attaching device, a hub provided with a cavity, $c$, having a shoulder, $i$, and an inlet, combined with an axle-nib slotted at its outer end, and a linchpin arranged to be received wholly within such slot, for the purpose of placing the wheel on and removing it from the axle, and also adapted, when the wheel is on the axle, to fall down in said slot and project into the cavity $c$ to abut against the shoulder $i$, to attach the wheel, substantially as described.

5. As a means for operating an inclosed, hidden, or secret hub-attaching device, the tool $k$, constructed and adapted to operate substantially as described.

In testimony whereof I affix my signature in presence of two witnesses.

JAMES R. ANDERSON.

Witnesses:
JNO. RYAN, Jr.,
DAVID DIXON.